United States Patent [19]

Vivant

[11] Patent Number: 4,876,290

[45] Date of Patent: Oct. 24, 1989

[54] MICROENCAPSULATION BY INTERFACIAL POLYADDITION

[75] Inventor: Gilbert Vivant, Lyon, France

[73] Assignee: Rhone-Poulenc Chimie, Courbevoie, France

[21] Appl. No.: 154,357

[22] Filed: Feb. 11, 1988

[30] Foreign Application Priority Data

Feb. 11, 1987 [FR] France ............................... 87 01899

[51] Int. Cl.[4] ............................................. B01J 13/02
[52] U.S. Cl. .................................. 521/76; 428/402.21;
428/402.24; 428/914; 424/408; 424/455;
424/497; 106/21; 264/4.7; 264/4.33; 521/65;
521/67
[58] Field of Search ............................... 264/4.33, 4.7;
428/402.24, 402.21, 914; 424/408, 455, 497;
521/65, 67, 76

[56] References Cited

U.S. PATENT DOCUMENTS 4,738,898  4/1988  Vivant ................................. 428/914

Primary Examiner—Morton Foelak
Attorney, Agent, or Firm—Burns, Doane, Swecker & Mathis

[57] ABSTRACT

Microcapsules, and especially suspensions of microencapsulated colorants well adapted for the manufacture of carbonless papers, are produced by emulsifying a hydrophobic organic fluid which includes an aliphatic diisocyanate and an isocyanurate ring trimer of an aliphatic diisocyanate, and optionally a dissolved organic material, in an essentially aqueous liquid containing a protective colloid, a surfactant, or both, wherein the weight ratio of aliphatic diisocyanate/trimer ranges from 0.05/1 to 0.70/1 and the surface tension between the aqueous phase and the hydrophobic organic phase ranges from 0 to 20 mN/m, and then forming microcapsules by interfacially reacting a polyamine with the emulsion which results, thereby constituting polyurea walls of said microcapsules by polyaddition.

14 Claims, No Drawings

MICROENCAPSULATION BY INTERFACIAL POLYADDITION

BACKGROUND OF THE INVENTION

1. Field of the Invention:

The present invention relates to the improved microencapsulation of compounds by interfacial polyaddition, and, more especially, to the preparation of microcapsules, the wall members of which are comprised of polyurea.

2. Description of the Prior Art:

Published French Patent Application No. 85-18,453, filed Dec. 10, 1985, describes a process of microencapsulation by interfacial polyaddition, by emulsifying, in an essentially aqueous liquid, a hydrophobic organic liquid containing a polyisocyanate and, if desired, a dissolved organic material, and then forming the walls of the microcapsules by adding a polyamine, such process being characterized in that the polyisocyanate comprises:

(i) an aliphatic diisocyanate; and (ii) the isocyanurate ring trimer of an aliphatic diisocyanate, in a diisocyanate/trimer weight ratio of 0.05/1 to 0.70/1.

The isocyanurate ring trimer may be the trimer of the aliphatic diisocyanate employed or the trimer of another aliphatic diisocyanate.

Representative aliphatic diisocyanates which may be employed are, for example, 1,6-diisocyanatohexane, 1,5-diisocyanato-2-methylpentane, 1,5-diisocyanato-3methylpentane, 1,4-diisocyanato-2,3-dimethylbutane, 2-ethyl-1,4-diisocyanatobutane, 1,5-diisocyanatopentane, 1,4diisocyanatobutane, 1,3-diisocyanatopropane, 1,10-diisocyanatodecane, 1,2-diisocyanatocyclohexane, 1,4 -diisocyanatocyclohexane, 1,2-bis(isocyanatomethyl) cyclobutane, bis(4-isocyanatocyclohexyl)methane and 3,3,5-trimethyl-5-isocyanatomethyl-1-isocyanatocyclohexane.

The isocyanurate ring trimers of these aliphatic diisocyanates are prepared in a manner which is known per se. For example, they may be prepared by heating in the presence of a catalyst such as a tertiary amine, a phosphine or an alkali or alkaline earth metal oxide, hydroxide or carboxylate. These catalysts are described in *Journal of Cellular Plastics*, January 1965, pages 85 to 90, or in *Macromolecular Chemistry*, (5/1) pages 103 to 109 (1970).

French Patent Application No. 81/02,192 (published under No. 2,499,085) describes a process for preparing these compounds containing an isocyanurate group by cyclotrimerization of aliphatic isocyanates, catalyzed by a substituted disilazane.

And French Patent Application No. 81/23,135 (published under No. 2,517,674) describes a process which is identical to that noted immediately above, catalyzed by a compound containing an aminosilyl group.

The aliphatic diisocyanate/trimer weight ratio preferably ranges from 0.10/1 to 0.45/1.

SUMMARY OF THE INVENTION

A major object of the present invention is the provision of an improved process for the microencapsulation of compounds by interfacial polyaddition.

Briefly, the present invention features emulsifying a hydrophobic organic liquid comprising an aliphatic diisocyanat, an isocyanurate ring trimer of an aliphatic diisocyanate, and, if appropriate, a dissolved organic material, in an essentially aqueous liquid containing a protective colloid and/or a surfactant, wherein the weight ratio of aliphatic diisocyanate/trimer ranges from 0.05/1 to 0.70/1 and the surface tension between the aqueous phase and the hydrophobic organic phase rangs from 0 to 20 mN/m, and then forming the walls of the microcapsules by adding a polyamine thereto.

DETAILED DESCRIPTION OF THE PREFERRED EMBODIMENTS OF THE INVENTION

More particularly according to the present invention, among the aliphatic diisocyanates which may be used in the subject improved process, 1,6-diisocyanatohexane (HDI) is the preferred. 1,6-Diisocyanatohexane is preferably employed together with its trimer, 1,3,5-tris(6-isocyanatohexyl) isocyanurate.

The polyamine which is reacted with the compounds containing isocyanate groups to form the walls of the microcapsules comprises at least two primary or secondary amine groups and which can be dissolved or dispersed in water.

By way of examples of such diamines, representative are 1,2-ethylenediamine, 1,3-diaminopropane, 1,4-diaminobutane, 1,6-diaminohexane, hydrazine, 1,4-diaminocyclohexane and 1,3-diamino-1-methylpropane.

Diethylenetriamine, triethylenetetramine and bis(2-methylaminoethyl) methylamine are also exemplary.

It is quite obviously possible to use mixtures of polyamines, for example a diamine and a triamine or a tetraamine.

The hydrophobic organic liquid in which the compound containing isocyanate functional groups and, if desired, an organic product to be encapsulated, are present, may be any liquid which is substantially immiscible with water and capable of dissolving the above compounds.

The hydrophobic organic liquid may also be the organic material to be encapsulated when the latter is liquid and when it is employed for applications requiring a high concentration of active product.

An aliphatic hydrocarbon, a chlorinated aliphatic hydrocarbon, an alicyclic hydrocarbon, a chlorinated alicyclic hydrocarbon, an aromatic hydrocarbon or a chlorinated aromatic hydrocarbon may, for example, thus be employed.

Exemplary of the hydrophobic organic liquids, representative are cyclohexane, tetrachloroethylene, carbon tetrachloride, xylenes, toluene, chlorobenzenes, at least partially hydrogenated terphenyl, an alkylbiphenyl or an alkylnaphthalene.

The alkylbiphenyls, at least partially hydrogenated terphenyl and the alkylnaphthalenes are very particularly suitable for the encapsulation of dyes in carbonless paper applications.

The substantially aqueous liquid employed in the process of the invention is generally water and preferably an aqueous solution of a surfactant and/or of a hydrophilic protective colloid.

The present invention is an improvement vis-a-vis the invention described in said published French Patent Application No. 85/18,453, more particularly as regards the selection of a hydrophilic protective colloid and/or of the surfactant.

It has indeed been observed that, in order to obtain an emulsion (and consequently microcapsules after the polyaddition reaction) containing very fine droplets of the hydrophobic organic liquid in the aqueous phase, it is preferable that the hydrophilic protective colloid and/or the surfactant be selected such that the surface tension between, on the one hand, the aqueous phase containing the protective colloid and/or the surfactant and, on the other hand, the hydrophobic organic phase, ranges from 0 to 20 millinewtons/meter (mN/m).

The surface tension preferably ranges from 0 to 15 mN/m.

The surface tension of the aqueous phase preferably ranges from 30 mN/m to 60 mN/m.

The classes of protective colloids which are more particularly suitable are, especially: maleic-vinyl copolymers such as the copolymers of vinyl ethers with maleic anhydride or acid, marketed under the registered trademark Gantrez, sodium lignosulfonates such as those marketed under the registered trademark Polyfon, maleic anhydride/styrene copolymers such as those marketed under the registered trademark Scriptset, ethylene/maleic anhydride copolymers such as those marketed under the registered trademark EMA, and copolymers of propylene oxide, ethylenediamine and ethylene oxide which are marketed under the trademark Tetronic.

The surfactants which are more particularly suitable per the present invention are especially the fatty acid esters of polyoxyethylenated sorbitol such as those marketed under the registered trademark Montanox and sodium dodecylsulfate.

When these protective colloids or surfactants are available in a number of different forms, such as in the form of salt, in the form of anhydride, or in the form of acid, it is generally preferred to use the anhydride or acid forms rather than the salt.

Thus, such is the case, for example, with the copolymers of vinyl ethers and maleic anhydride or acid.

Generally, the aqueous solutions of the salt forms of these protective colloids or surfactants characteristically have a higher surface tension than the aqueous solutions of the acid or anhydride forms. And, as indicated above, it is preferred according to this invention to use aqueous phases containing the protective colloids and/or the surfactants which have a surface tension of between 30 and 60 mN/m.

Even more preferably, aqueous phases are used having surface tensions ranging from 35 to 50 mN/m.

The surface tension of the aqueous and organic phases may be measured by any known means (see, for example, the ISO/DIS draft standard 304).

It is possible, in particular, to employ Wilhelmy's blade method which is described in *Physical Chemistry of Surfaces*, by Arthur W. Adamson, 3rd Edition, John Wiley and Sons (1976), page 23, chapter I.

The surface tension between the two phases corresponds to the difference between the surface tensions of the two phases; however, the measurement carried out sometimes yields slightly different results.

In general, the protective colloids are in the aqueous phase at a weight concentration of 0.1 to 5% and preferably from 0.5 to 3%.

The surfactants are usually employed at lower weight concentrations, for example from 0.001 to 3% and preferably from 0.005 to 2%.

The material which is present in the hydrophobic organic liquid and which it is desired to encapsulate may be very diverse in nature.

It is possible, for example, to encapsulate plant protection products such as herbicides, fungicides or insecticides, which makes their handling less dangerous.

It is also possible to encapsulate pharmaceutical products, food products, flavors, perfumes, colorants, paints or catalysts, etc.

One of the preferred applications of the process of the invention is in the microencapsulation of colorants, for the preparation of pressure-sensitive carbonless paper. The process of the invention results in microcapsules having leakproof walls which are suitable for such application. This makes it possible to produce multicopy papers which do not release any colorant when they are stored or handled.

Furthermore, the process of the invention makes it possible to prepare microcapsule suspensions having sufficient fluidity to permit a uniform and fine coating on paper.

Using this process, it is possible to produce microcapsule suspensions of relatively high concentrations, which is of interest with regard to papermaking applications, because water must subsequently be removed.

In general, for this type of application, the microcapsule concentration is equal to or greater than 25% by weight and preferably equal to or greater than 30% by weight.

Triphenylmethane derivatives, diphenylmethane derivatives, fluorane derivatives, thiazine derivatives and spiran derivatives are advantageously employed as colorants.

Among the triphenylmethane derivatives, representative are, for example, 3,3-bis(paradimethylaminophenyl)-6-dimethylaminophthalide, 3,3-bis(paradimethylaminophenyl)phthalide and 3-(para-dimethylaminophenyl 3-(1,2-dimethyl-3-indolyl)phthalide.

Among the diphenylmethane derivatives, representative are, for example, 4,4-bis(aminodimethyl)benzhydryl benzyl oxide, N-halophenylleucoauramines and N-(2,4,5-trichlorophenyl)leucoauramine.

Exemplary of the fluorane derivatives are chloro-7-diethylaminofluorane, 3-chloro-7-diethylamino-2-methylfluorane and 6-(N-ethylpara-tolylamino)-3-methyl-2-phenylaminofluorane.

Exemplary of the thiazine derivatives are benzoylleucomethylene blue and para-nitrobenzylleucomethylene blue.

And exemplary of the spiran derivatives are 3-methylspirodinaphthopyran, 3-ethylspirodinaphthopyran, 3-propylspirodinaphthopyran and 3-propylspirodibenzopyran.

In practice, the subject process may be conveniently carried out in the following manner:

An aqueous phase is prepared, of water to which a surfactant and/or a protective colloid such as those indicated above have been added. This phase may be stirred at several thousand revolutions per minute, using a turbine stirrer, for a few seconds to a few minutes, but this is not essential. The hydrophobic organic phase is then added, including a solvent in which there are dissolved the mixture of aliphatic diisocyanate and of its isocyanurate group trimer and, where appropriate, the material to be encapsulated. As indicated above, the hydrophobic organic phase may also be the organic material to be encapsulated, when it is liquid, and the mixture of aliphatic diisocyanate and of its isocyanurate ring trimer. After a period of fast stirring for a few seconds to a few minutes, a stable emulsion is obtained. The rate of stirring is adjusted such that droplets of hydrophobic organic liquid in the aqueous phase are obtained with the desired sizes.

The size of the droplets is a function of the selection of the protective colloid and/or of the surfactant and of the rate of stirring, the latter being selected proportionally higher, the smaller the average diameters of the droplets which are desired.

The present invention makes it possible to produce emulsions of very fine droplets of organic phase in the aqueous phase. The microcapsules obtained after interfacial polyaddition have, generally predominantly, a diameter below or equal to 10 μm.

In general, the rate of stirring during the emulsion stage is from 5,000 to 10,000 revolutions per minute. The emulsion stage is usually carried out at a temperature of 15° to 30° C.

Generally, when the emulsion stage is completed, the turbine stirring is stopped and the emulsion is stirred using an ordinary stirrer, for example of the frame stirrer type, at a rate on the order of 200 to 1000 revolutions per minute.

An aqueous solution of polyamine is then added. The quantity of polyamine which is introduced is usually in excess, relative to the stoichiometric amount needed to convert the free isocyanate groups into urea groups. In most cases, from 101% to 150% of amine groups are introduced relative to the free isocyanate groups, and preferably from 105% to 125%.

The emulsion produced may also be transferred into another reactor upon completion of the emulsion stage, and the polyaddition stage, described earlier, may then be carried out.

The polyaddition reaction is permitted to take place generally at a temperature ranging from approximately 15° C. to 30° C. for a period of time ranging from a few minutes to two hours. Then, in most cases, the temperature of the emulsion has increased to approximately 50° C. to 80° C. and the reaction is continued at this temperature for a few hours, for example from 2 to 10 hours.

The process of the invention may be carried out continuously.

Thus, it is possible, for example, to prepare the emulsion described above in a first reactor. The emulsion thus prepared may be continuously transferred to a second stirred reactor containing an aqueous solution of polyamine. The interfacial polyaddition reaction is carried out in the second reactor, and when practically all the polyamine has reacted, the emulsion originating from the first reactor may be transferred to a third reactor, also containing a solution of polyamine.

It will be appreciated that this continuous operation alternative is merely illustrative.

In order to further illustrate the present invention and the advantages thereof, the following specific examples and comparative example are given, it being understood that same are intended only as illustrative and in nowise limitative.

COMPARATIVE EXAMPLE

A solution (a):
 (i) sodium salt of carboxymethyl cellulose: 8 g;
 (ii) distilled water: 800 cm$^3$,
was charged into a 1.5-liter Pyrex glass reactor comprising a jacket permitting liquid circulation for heating or cooling, a lid, a condenser, a Polytron turbine stirrer and a stainless steel frame stirrer coated with Teflon.

The surface tension of the solution (a) was 73.1 mN/m.

Stirring was carried out using the turbine stirrer at 7,800 rev/min for 30 seconds at ambient temperature and then, while the stirring was continued for 60 seconds, the following solution (c) was added:
dye solution:
 (i) diisopropylnaphthalene (KMC): 200 g;
 (ii) Pergascript Blue S 4G dye: 10 g;
 (iii) hexadecane: 4 g;
 (iv) 1,6-diisocyanatohexane: 9.13 g (5.4×10$^{-2}$ mole);
 (v) 1,3,5-tris(6-isocyanatohexyl) isocyanurate: 36.5 g (7.2×10$^{-2}$ mole).

The surface tension of the solution (c) was 35 mN/m.

The surface tension between the two phases was approximately 36 mN/m.

The weight relationship of the diisocyanate to the trimer was 0.25/1.

A stable emulsion of droplets of organic phase in the aqueous phase was obtained.

The frame stirrer was begun at 300 rev/min, the turbine stirrer was stopped and the following solution (b) was added:
 (i) ethylenediamine: 11.74 g (19.56×10$^{-2}$ mole);
 (ii) distilled water: 5.8 g.
120% of amine relative to the isocyanates.

The stirring was continued for 30 minutes at ambient temperature and then heating to 60° C. was carried out by means of a water circulation through the reactor jacket. This temperature was maintained for 3 hours.

After cooling, a milky suspension was obtained containing 40% by weight of microcapsules, 80% of which had a diameter below or equal to 14 μm (particle size distribution measured with a Malvern instrument).

This suspension was coated onto the face surface of a receiver paper coated by means of an acidic resin serving as developer (coating fraction: CF). The coating of the microcapsule suspension was done with the aid of a blade whose height was set at 20–30 μm relative to the paper. The paper treated in this manner was placed in an oven at 100° C. in the absence of light. After 24 hours, no coloration was observed.

EXAMPLE 1

A solution (a):
 (i) 1.3 g of a maleic anhydride/methyl vinyl ether copolymer (Gantrez AN 119);
 (ii) 65 g of distilled water (the copolymer was dissolved beforehand by being heated at 70° C. for 2 hours); was charged into a 500-cm$^3$ Pyrex glass reactor comprising a jacket permitting fluid circulation for heating or cooling, a lid, a condenser, a turbine stirrer (Polytron) and a stainless steel frame stirrer coated with Teflon.

The surface tension of solution (a) was 47.1 mN/m.

Stirring was carried out using the turbine stirrer at 7800 rev/min, and then solution (c) was added:
dye solution comprising:
 (i) partially hydrogenated terphenyl of registered trademark Solgyl TH 40 : 51.6 g;
 (ii) hexadecane: 0.8 g;
 (iii) dyes: Blue S 4G: 1.35 g; Pergascript Red 6 B: 1.35 g;
 (iv) 1,6-diisocyanatohexane: 2.28 g (1.35×10$^{-2}$ mole);
 (v) 1,3,5,-tris(6-isocyanatohexyl)isocyanurate: 9.14 g (1.8×10$^{-2}$ mole).

The surface tension of solution (c) was 37.8 mN/m.

The surface tension between the two phases was approximately 9 mN/m.

The weight relationship between the 1,6-diisocyanatohexane and its trimer was 0.25/1.

The stirring was continued for 60 seconds. A stable emulsion was then obtained and microscopic inspection thereof enabled the conclusion that it comprised a majority of droplets having a diameter of from 3 to 5 μm.

The frame stirrer was begun at 300 rev/min, the turbine stirrer was stopped and the following solution (b) was added:
 (i) ethylenediamine: 2.94 g (4.9×10$^{-2}$ mole);
 (ii) distilled water: 35 g.

The stirring was continued for 30 seconds at ambient temperature and then heating to 60° C. was carried out using a water circulation through the reactor jacket. This temperature was maintained for 3 hours.

After cooling, a milky suspension was obtained, containing 40% by weight of microcapsules, most of which (approximately 80%) had a diameter below or equal to 8 μm (particle size distribution measured with a Malvern instrument).

This suspension was employed in coating onto a developer paper (CF) over a thickness of 20 to 30 μm. After 24 hr in the oven at 100° C., in the absence of light, no coloration was observed.

EXAMPLE 2

The following solutions were used in the same reactor, the operating conditions being the same as in Example 1.

Solution (a):
 (i) 1.3 g of a maleic acid/methyl vinyl ether copolymer (Gantrez S 95);
 (ii) 65 g of distilled water (the copolymer was dissolved beforehand by being stirred for 15 minutes at ambient temperature).

The surface tension of solution (a) was 49.6 mN/m.

Solution (c):
Dye solution comprising:
 (i) diisopropylnaphthalene (KMC 113): 51.6 g;
 (ii) hexadecane: 0.8 g;
 (iii) dyes:
  Blue S 4G: 1.35 g;
  Blue I 2R: 1.35 g;
 (iv) 1,6-diisocyanatohexane: 2.28 g (1.35×10$^{-2}$ mole);
 (v) 1,3,5-tris(6-isocyanatohexyl) isocyanurate: 9.14 g (1.8×10$^{-2}$ mole).

The surface tension of solution (c) was 35 mN/m.

The surface tension between the two phases was approximately 14 mN/m.

Solution (b):
 (i) ethylenediamine: 2.94 g (4.9×10$^{-2}$ mole);
 (ii) distilled water: 35 g.

The following results were obtained:
microcapsule diameter: mostly ranging from 5 to 8 μm,
approximately 80% of the microcapsules had a diameter below or equal to 9 μm (Malvern instrument)
paper coating: no coloration after 24 hours at 100° C.

EXAMPLE 3:

The following solutions were used in the same reactor, the operating conditions being the same as in Example 1.

Solution (a):
 (i) 1.3 g of a maleic anhydride/methyl vinyl ether copolymer (Gantrez AN 119);
 (ii) 65 g of distilled water (the copolymer was dissolved beforehand by being heated to 70° C. for 2 hours).

The surface tension of solution (a) was 49.6 mN/m.

Solution (c):
dye solution comprising:
 (i) diisopropylnaphthalene (KNC 113): 51.6 g;
 (ii) hexadecane: 0.8 g;
 (iii) dyes:
  Blue S 4G: 1.35 g;
  Blue I 2R: 1.35 g;
 (iv) 1,6-diisocyanatohexane: 2.28 g (1.35×10$^{-2}$ mole);
 (v) 1,3,5-tris(6-isocyanatohexyl) isocyanurate: 9.14 g (1.8×10$^{-2}$ mole).

The surface tension of solution (c) was 35 mN/m.

The surface tension between the two phases was approximately 14 mN/m.

Solution (b):
 (i) ethylenediamine: 2.94 (4.9×10$^{-2}$ mole);
 (ii) distilled water: 35 g.

The following results were obtained:
microcapsule diameter: mostly ranging from 5 to 8 μm,
approximately 80% of the microcapsules had a diameter below or equal to 9 μm (Malvern instrument)
paper coating: no coloration after 24 hours at 100° C.

EXAMPLE 4:

The following solutions were used in the same reactor, the operating conditions being the same as in Example 1.

Solution (a):
 (i) 1.3 g of an ethylene/maleic anhydride copolymer (EMA 21);
 (ii) 65 g of distilled water (the copolymer was dissolved beforehand by being heated to 70 C for 2 hours).

The surface tension of solution (a) was 41 mN/m.

Solution (c):
dye solution comprising:
 (i) partially hydrogenated terphenyl of registered trademark Solgyl TH 40: 51.6 g;
 (ii) hexadecane: 0.8 g;
 (iii) Pergascript 6 B Red dye: 1.35 g;
 (iv) 1,6-diisocyanatohexane: 2.28 g (1.35×10$^{-2}$ mole);
 (v) 1,3,5-tris(6-isocyanatohexyl) isocyanurate: 9.14 g (1.8×10$^{-2}$ mole).

The surface tension of solution (c) was 37.8 mN/m.

The surface tension between the two phases was approximately 3 mN/m.

Solution (b):
 (i) ethylenediamine: 2.94 g (4.9 g×10$^{-2}$ mole);
 (ii) distilled water: 35 g.

The following results were obtained:
microcapsule diameter: mostly ranging from 5 to 8 μm,
approximately 80% of the microcapsules had a diameter below or equal to 9 μm (Malvern instrument)
paper coating: no coloration after 24 hours at 100° C.

EXAMPLE 5

(Continuous test)

Apparatus:

This comprised:

(1) a Milton Roy trademark multiple-head feed pump;
(2) a jacketed glass emulsifier with provision for the circulation of a hot or cold fluid, 260 cm$^3$ in capacity, feed via flexible tubing in its upper part, stirring by means of an Ultra-Turax T45 turbine stirrer;
(3) a jacketed 5-liter cylindrical glass reactor, with an anchor stirrer and baffles, fitted with a drain valve in its base.

The emulsifier could operate continuously and fed the reactor via a side overflow (spillway), the residence time required for the emulsion quality being controlled by means of the feed flow rates.

SOLUTIONS

Solution (a):
(i) 44 g of a maleic anhydride/methyl vinyl ether copolymer (Gantrez AN 119);
(ii) 2,200 g of distilled water (the copolymer was dissolved beforehand by being heated to 70° C. for 2 hours).

The surface tension of solution (a) was 47.1 mN/m.
Solution (c):
(i) Crystal violet lactone: 52.5 g;
(ii) Blue S 4G: 36 g;
(iii) diisopropylnaphthalene: 1,652 g.

The dyes were dissolved in the diisopropylnaphthalene at 80° C.
After cooling,
(iv) 27 g of hexadecane were added; followed by
(v) 73 g of 1,6-diisocyanatohexane (0.43 mole); and
(vi) 292.4 g of 1,3,5-tris(6-isocyanatohexyl) isocyanurate (0.58 mole).

Isocyanate/trimer weight ratio: 0.20/1.
Solution (b):
(i) 86 g (1.43 mole) of ethylenediamine);
(ii) 1,000 g of distilled water. 110% of amine relative to the isocyanates.

OPERATION

Solution (b) was charged into the 5-liter reactor and was stirred at 300 rev/min.

The emulsifier was fed with, on the one hand, solution (a) at a rate of 4.056 liters/hour and, on the other hand, with solution (c) at a rate of 3.66 liters/hour. This corresponded to an emulsification time of approximately 60 seconds.

The rate of stirring with the Ultra-Turax was 8,500 rev/min.

Approximately 30 minutes were required for all of the solutions (a) and (c) to be in the 5-liter reactor after emulsion.

Stirring was continued for 30 minutes at ambient temperature in the 5-liter reactor and then the reaction mixture was heated by circulating water at 60° C. for 3 hours.

After cooling, 4,818 g of a milky suspension containing 40% by weight of microcapsules were drained out. Particle size distribution measurements using a Malvern instrument showed that the particles size distribution was centered on 5 μm (approximately 80% of the microcapsules had a diameter below or equal to 10 μm).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of microcapsules, comprising emulsifying a hydrophobic organic liquid which includes an aliphatic diisocyanate and an isocyanurate ring trimer of an aliphatic diisocyanate, in an essentially aqueous liquid containing a protective colloid, a surfactant, or both, wherein the weight ratio of aliphatic diisocyanate/trimer ranges from 0.05/1 to 0.70/1 and the surface tension between the aqueous phase and the hydrophobic organic phase ranges from 0 to 20 mN/m, and then forming microcapsules by interfacially reacting a polyamine with the emulsion which results, thereby constituting polyurea walls of said microcapsules by polyaddition.

2. The process as defined by claim 1, said hydrophobic organic liquid further including a dissolved organic material sought to be microencapsulated.

3. The process as defined by claims 1 or 2, wherein the surface tension between the aqueous phase and the hydrophobic organic phase ranges from 0 to 15 mN/m.

4. The process as defined by claims 1 or 2, wherein the surface tension of the aqueous phase ranges from 0 to 60 mN/m.

5. The process as defined by claim 4, wherein the surface tension of the aqueous phase ranges from 35 to 50 mN/m.

6. The process as defined by claims 1 or 2, said protective colloid comprising a maleic-vinyl copolymer, a sodium lignosulfonate, a maleic anhydride/styrene copolymer, an ethylene/maleic anhydride copolymer or a copolymer of propylene oxide, ethylenediamine and ethylene oxide, and said surfactant comprising a fatty acid ester of polyoxyethylenated sorbitol and sodium dodecylsulfate.

7. The process as defined by claims 1 or 2, wherein protective colloids are present in the aqueous phase in a weight concentration of from 0.1 to 5%.

8. The process as defined by claims 1 or 2, wherein surfactants are present in the aqueous phase in a weight concentration of from 0.001 to 3%.

9. The process as defined by claims 1 or 2, said diisocyanate comprising 1,6-diisocyanatohexane, 1,5-diisocyanato-2-methylpentane, 1,5-diisocyanato-3-methylpentane, 1,4-diisocyanato-2,3-dimethylbutane, 2-ethyl-1,4-diisocyanatobutane, 1,5-diisocyanatopentane, 1,4-diisocyanatobutane, 1,3-diisocyanatopropane, 1,10-diisocyanatodecane, 1,2-diisocyanatocyclobutane, bis(4-isocyanatocyclohexyl)methane, or 3,3,5-trimethyl-5-isocyanatomethyl-1-isocyanatocyclohexane.

10. The process as defined by claims 1 or 2, said polyamine being water soluble or dispersible and comprising at least two primary or secondary amine groups.

11. The process as defined by claims 1 or 2, said hydrophobic organic liquid comprising an aliphatic hydrocarbon, a chlorinated aliphatic hydrocarbon, an alicyclic hydrocarbon, a chlorinated alicyclic hydrocarbon, an aromatic hydrocarbon, or a chlorinated aromatic hydrocarbon.

12. The process as defined by claim 11, said hydrophobic organic liquid comprising an alkylbiphenyl, an at least partially hydrogenated terphenyl or an alkylnaphthalene.

13. The process as defined by claim 2, said dissolved organic material comprising a herbicide, pesticide, pharmaceutical, foodstuff, flavor, fragrance, colorant, paint or catalyst.

14. The product of the process as defined by claims 1 or 2, wherein said product has leak proof walls.

* * * * *